United States Patent Office.

CHARLES A. DRESSER, OF NEW YORK, N. Y.; GEORGE A. DRESSER, TRUSTEE.

Letters Patent No. 71,860, dated December 10, 1867.

IMPROVEMENT IN PRODUCING CALCIUM-MAGNESIUM LIGHT.

The Schedule referred to in these Letters Patent and making part of the same.

TO ALL WHOM IT MAY CONCERN:

Be it known that I, CHARLES A. DRESSER, of the city, county, and State of New York, have invented a new Means for Producing Light, which I denominate the "Calcia-Magnesian Light;" and I do hereby declare that the following is a full, clear, and exact description thereof.

The mineral known as dolomite, which, in the native state, contains about fifty-four parts of magnesia and forty-six parts of lime, when subjected to the heat of inflamed hydrogen or other inflammable gas, gives out a very brilliant light, but it decrepidates, and for that reason cannot be used for the purpose of illumination. I have discovered, however, that if it be pulverized and then cemented, and afterwards subjected to a sufficient heat to drive out the carbonic acid and water, it will then successfully resist the action of an inflamed jet of hydrogen or other inflammable gas, without decrepitating, and will give out a very brilliant and steady light.

I take dolomite in its native state, or magnesia and lime in about the proportions in which they are found in native dolomite, and reduce it or them to a fine powder; but if I use the dolomite in the native state, I prefer to calcine it, as it can, in that condition, be more readily pulverized and reduced to an impalpable powder, for the finer the powder the more perfect will be the result. The pulverized dolomite, native or artificial, is then to be cemented and formed into small cylinders, or other suitable forms, of the required size for the purpose, which I prefer to effect by a solution of chloride of calcium in water. A good solution for the purpose will consist of one part, by weight, of chloride of calcium, to three parts of water. In this way I have successfully cemented the ingredients, so as to form an artificial dolomite which successfully resists the heat of the flame. Before the composition sets it may be readily moulded into the forms required, and subjected to pressure, and after it has been pressed it must be subjected to a heat of about 600°, Fahrenheit's scale, until the carbonic acid and water are expelled, and after this it can be exposed to the flame of hydrogen or other inflammable gas without decrepitating.

This composition for the production of light is to be applied in the well-known way of producing light by the action of a jet of inflamed hydrogen or other inflammable gas or gases on a solid substance; and as I make no claim to the apparatus, or mode of applying the jet or jets of inflamed gas, it is deemed unnecessary to give a description of it. Nor do I wish to be understood as limiting my claim of invention to the use of any special mode of applying the gas or gases, as my invention relates solely to the preparation of the composition on which the inflamed gas is to act to produce light. And although I have above stated that I use a solution of chloride of calcium in water, to effect the cementation of the pulverized dolomite, or of its ingredients, the magnesia and lime, I have done so because I have found it to be effectual for that purpose; but I do not wish to limit my claim of invention to the use of such solution, as other and analogous substances may be substituted, which will effect the same result in substantially the same way.

What I claim as my invention, and desire to secure by Letters Patent, is—

The preparation of dolomite, native or artificial, substantially as and for the purpose described.

CHARLES A. DRESSER.

Witnesses:
    WM. H. BISHOP,
    A. DE LACY.